United States Patent [19]

Kinoshita

[11] 4,167,851
[45] Sep. 18, 1979

[54] GAS TURBINE ENGINE CONTROL SYSTEM

[75] Inventor: Keijiro Kinoshita, Yokohama, Japan

[73] Assignee: Nissan Motor Company, Limited, Yokohama, Japan

[21] Appl. No.: 715,834

[22] Filed: Aug. 19, 1976

[30] Foreign Application Priority Data

Aug. 20, 1975 [JP] Japan ................. 50/101006

[51] Int. Cl.² ............................................. F02C 9/04
[52] U.S. Cl. .................... 60/39.28 R; 60/39.33; 60/39.64
[58] Field of Search ................. 60/39.16 SI, 39.16, 60/39.14, 39.18 C, 39.19, 414, 413, 39.33, 39.64

[56] References Cited

U.S. PATENT DOCUMENTS

| | | | |
|---|---|---|---|
| 2,714,802 | 8/1955 | Wosika | 60/39.19 X |
| 2,737,017 | 6/1956 | Feiss | 60/39.19 |
| 3,037,348 | 6/1962 | Gassman | 60/39.16 SI |
| 3,088,277 | 5/1963 | North et al. | 60/39.14 |
| 3,093,968 | 6/1963 | Osofsky | 60/39.19 X |
| 3,145,532 | 8/1964 | Moss | 60/39.14 |
| 3,157,993 | 11/1964 | Duttmann | 60/39.14 |
| 3,465,162 | 9/1969 | Oprecht | 60/39.14 X |
| 3,488,947 | 1/1970 | Miller | 60/39.16 SI |
| 3,546,879 | 12/1970 | Hass | 60/39.16 SI |
| 3,587,766 | 6/1971 | Slade | 60/39.18 C |
| 3,704,586 | 12/1972 | Bruns | 60/39.14 |
| 3,762,161 | 10/1973 | Pennig | 60/39.16 SI |
| 3,831,373 | 8/1974 | Flynt | 60/39.33 |
| 4,043,120 | 8/1977 | Hoffeins | 60/39.14 |

*Primary Examiner*—Robert E. Garrett

[57] ABSTRACT

An energy producing device is driven by a motor vehicle equipped with a gas turbine engine to produce an energy stored and concurrently to give an engine braking effect to the engine to provide a braking force to decelerate the vehicle and the supply of fuel to a combustion chamber of the engine is stopped during coasting of the vehicle and during idling of the engine and the stored energy is employed for rotation of a compressor and a power turbine of the engine in lieu of fuel during coasting of the vehicle and during idling of the engine.

15 Claims, 3 Drawing Figures

GAS TURBINE ENGINE CONTROL SYSTEM

The present invention relates generally to a system for giving an engine braking effect to a gas turbine engine and for saving fuel for the engine and particularly to a control system for a twin shaft type gas turbine engine in which an energy producing device is driven by a drive shaft of a motor vehicle equipped with the engine to produce an energy and the produced energy is utilized for operation of the engine in lieu of fuel so that an engine braking effect for decelerating the vehicle is given to the engine and fuel consumption of the engine is reduced.

As is well known in the art, although a twin shaft type gas turbine engine is suitable as an engine for a motor vehicle since it has a superior characteristics of rotational speed versus torque as compared with that of a single shaft type gas turbine engine, it has had drawbacks that the effectiveness of an engine braking is poor and fuel consumption is large during idling and coasting of the engine.

For increasing the effectiveness of the engine braking of a twin shaft type gas turbine engine, although a measure has been taken, for example, such as reversing the direction of a variable nozzle or interposing a clutch between a compressor turbine and a power turbine, the measures have failed to obtain a sufficient and/or effective engine braking and have unduly complicated the construction of the engine.

On the other hand, notwithstanding that fuel consumption cannot be ignored since it is necessary to maintain idling speed of the gas turbine engine at a high speed to the extent of about the half (20,000 r.p.m.) of the maximum speed of the engine so as to minimize the time necessary to accelerate the engine to ensure the operational performance of a motor vehicle equipped with the engine and since it is necessary to continue to drive or rotate a gas producing section (a compressor and a turbine) of the engine by supplying fuel even during coasting of the vehicle, no measure for reducing fuel consumption has been thus far taken.

It is, therefore, an object of the invention to provide a control system for a gas turbine engine which comprises an energy producing device driven by a motor vehicle equipped with the engine to produce energy and means for utilizing the produced energy for operation of the engine in lieu of fuel so that an engine braking effect for decelerating the vehicle is given to the engine and fuel consumption thereof is reduced.

This and other objects and advantages of the invention will become more apparent from the following detailed description taken in connection with the accompanying drawings in which.

Figure 1:
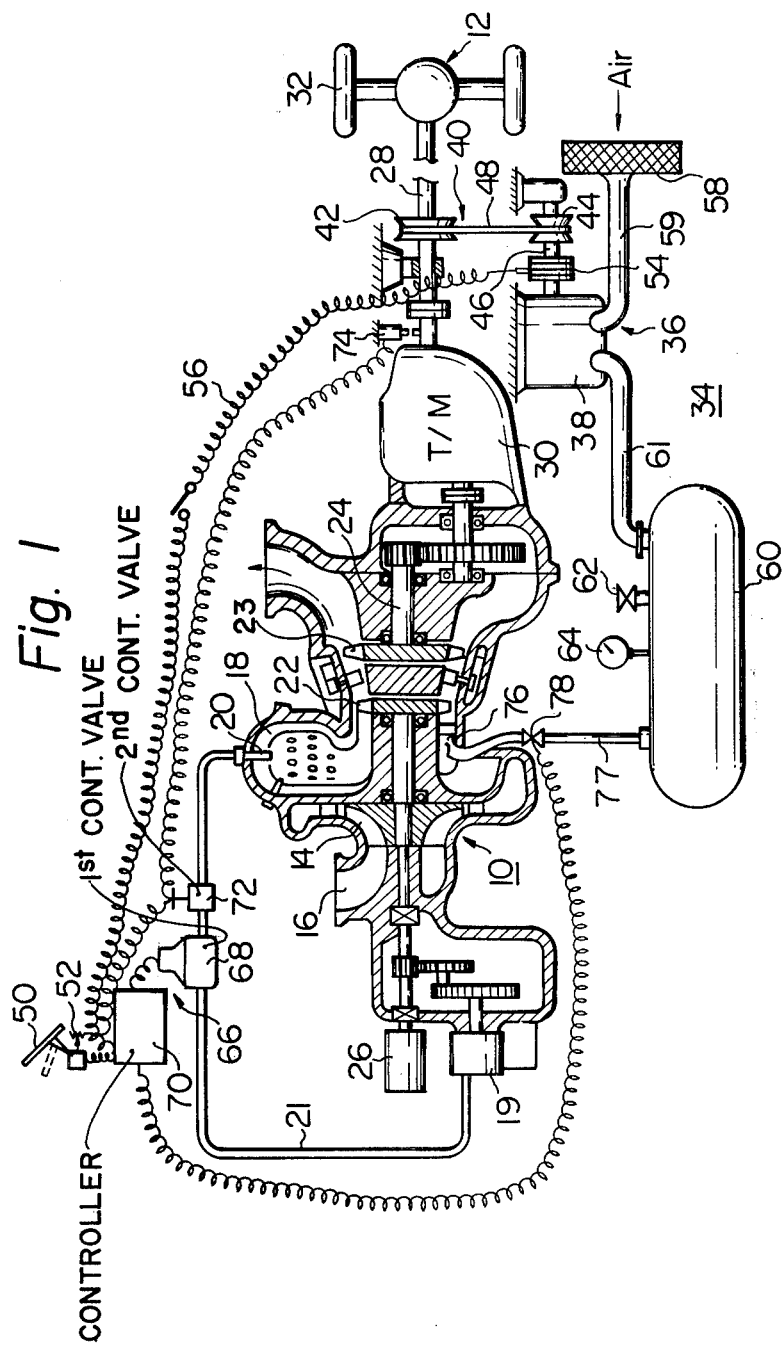
FIG. 1 is a schematic view of a first preferred embodiment of a control system according to the invention.

Referring to FIG. 1 of the drawings, there is shown a principal portion of a twin shaft type gas turbine engine 10 for a motor vehicle 12 and a control system according to the invention which is combined with the gas turbine engine 10. The gas turbine engine 10 is shown to include a compressor 14 which is rotated to draw air from an inlet port 16 and to produce compressed air, a combustion chamber 18 having an inlet which communicates with the compressor 14 and through which the compressed air is forced into the combustion chamber 18, a fuel pump 19 discharge fuel under pressure, and a fuel injecting valve 20 communicating with the fuel pump 19 through a conduit 21 and opening into the combustion chamber 18 and injecting fuel under pressure from the fuel pump 19 thereinto. The fuel is mixed with the compressed air and is burned in the combustion chamber 18 to produce combustion gas. The combustion chamber 18 has an outlet communicating with a compressor turbine 22 and through which the combustion gas is fed into the compressor turbine 22. A power turbine 23 communicates with the compressor turbine 22 to receive the combustion gas therefrom. The combustion gas expands in the turbines 22 and 23 and the heat energy of the combustion gas is converted into mechanical energy to rotate the compressor 14 and an output shaft 24. A starting motor 26 is provided to drive the compressor 14 for permitting starting of the gas turbine engine 10. The vehicle 12 is shown to include a propeller shaft 28 connected to the output shaft 24 through a transmission 30, and wheels 32 driven by the propeller shaft 28.

The control system, generally designated by the reference numeral 34, comprises means 36 for imparting an engine braking effect for retarding or decelerating the vehicle 12 to the gas turbine engine 10. The means 36 comprises an energy producing device 38 which is driven by a drive shaft for driving the vehicle 12 to produce an energy which is stored for use, and drive means 40 for driving the energy producing device 38. The energy producing device 38 comprises in this embodiment an air compressor. The compressor 38 is, for example, a displacement compressor such as of Roots or vane type. The drive means 40 comprises a drive pulley 42 fixedly mounted on the propeller shaft 28 of the vehicle 12, a driven pulley 44 fixedly mounted on an input shaft or a drive shaft 46 for driving the compressor 38, and a belt 48 for connecting the drive pulley 42 to the driven pulley 44. The compressor 38 is driven by the propeller shaft 28 through the drive means 40 to produce compressed air so that an engine braking effect is given to the engine 10 to provide a braking force to decelerate the vehicle 12. An accelerator pedal 50 is provided which controls fuel supplied from the fuel injecting valve 20 into the combustion chamber 18. Drive control means is provided to prevent the gas turbine engine 10 from being resisted by the operation of the compressor 38 when the accelerator pedal 50 is depressed as during acceleration and steady operation. The drive control means comprises means 52 for sensing the degree of depression of the accelerator pedal 50, and an electromagnetic clutch 54 mounted on the drive shaft 46 to control the connection between the compressor 38 and the driven pulley 44 and electrically connected to the sensing means 52 through an electric wire 56. The sensing means 52 controls to demagnetize the electromagnetic clutch 54 to disconnect the compressor 38 from the driven pulley 44 to inhibit the compressor 38 to be driven when the accelerator pedal 50 is depressed and to magnetize the electromagnetic clutch 54 to connect the compressor 38 to the driven pulley 44 to permit the compressor 38 to be driven when the accelerator pedal 50 is not depressed.

The retarder means 36 further comprises an air cleaner 58 communicating with an inlet port (not shown) of the compressor 38 through a conduit 59 and from which air is drawn by the compressor 38, and a compressed air reservoir or accumulator 60 communicating with an outlet port (not shown) of the compressor 38 through a conduit 61 and into which compressed air is discharged from the compressor 38 to store the compressed air in the reservoir 60. A relief valve 62 is provided on the reservoir 60 and is operable to release air from the reservoir 60 into the atmosphere when the pressure of air in the reservoir 60 exceeds a preset value. A pressure gauge 64 of the reservoir 60 is provided in a driver chamber (not shown) of the vehicle 12 for observation by the driver.

The control system 34 further comprises means 66 for interrupting the supply of fuel to the fuel injector 20 when the vehicle 12 is coasting or is travelling with the accelerator pedal 50 released and when the vehicle 12 is at a standstill. The means 66 comprises a control valve 68 disposed in the conduit 21, and a controller 70 for controlling the degree of opening of the control valve 68 in accordance with the degree of depression of the accelerator pedal 50. The controller 70 closes the control valve 68 to make the amount of fuel fed to the fuel injector 20 zero when the accelerator pedal 50 is released. A second control valve 72 may be disposed in the conduit 21 downstream of the first control valve 68 to close the conduit 21 when the speed of the vehicle 12 is below a predetermined value such as, for example, 30 to 40 Km/hr with the accelerator pedal 50 released. The second control valve 72 has a solenoid (not shown) for operating it and a sensor 74 electrically connected to the solenoid and responsive to the speed of the vehicle 12 below the predetermined value to produce an output signal which is fed to the solenoid to energize it to close the second control valve 72. In this instance, the first control valve 68 is controlled by the controller 70 to open the conduit 21 a minimum amount when the accelerator pedal 50 is released and the speed of the vehicle 12 is above the predetermined value.

The control system 34 further comprises means for utilizing the energy produced by the energy producing device 38 for operation of the engine 10 in lieu of fuel. The means comprises in this embodiment a nozzle 76 communicating with the compressed air reservoir 60 through a conduit 77 and opening into the outlet of the combustion chamber 18 to inject compressed air aimed at the turbine 22. A safety valve 78 is disposed in the conduit 77 to open it to permit the compressed air to pass to the nozzle 76 when the pressure of air in the reservoir 60 is above a predetermined value and to close the conduit 77 to inhibit the compressed air to pass to the nozzle 76 when the pressure of air in the reservoir 60 is below the preset value. The injection of compressed air from the nozzle 76 to the turbine 22 serves to prevent the rotation of the compressor 14 and the turbine 22 from stopping when the supply of fuel into the combustion chamber 18 is cut off and to make it possible to quickly accelerate the vehicle 12 without delay and without receiving the aid of the starting motor 26 when the accelerator pedal 50 is depressed for accelerating the vehicle 12 during coasting operation thereof and further to provide and maintain idling of the engine 10 to make it possible to quickly start the vehicle 12 without time lag and without obtaining the aid of the starting motor 26 when the vehicle 12 is temporarily at a standstill. The controller 70 may be electrically connected to the safety valve 78 to open it even if the pressure of air in the reservoir 60 is below the last-mentioned predetermined value when the controller 70 closes the first control valve 68.

Figure 2:
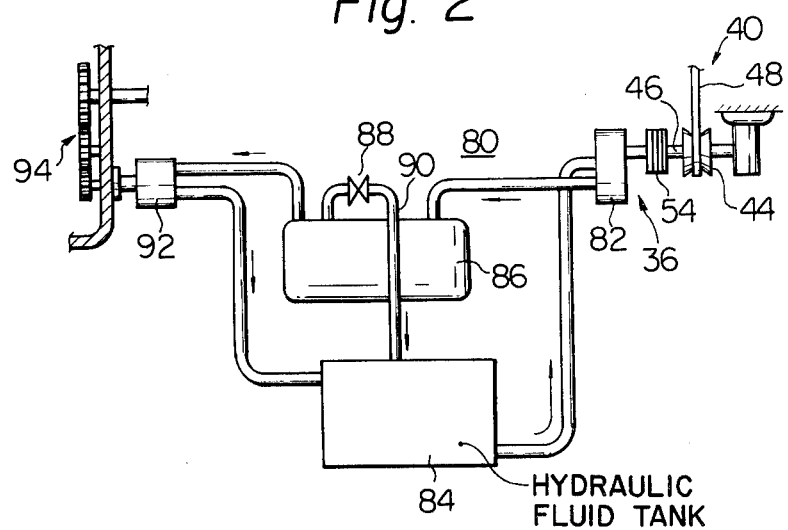
FIG. 2 is a schematic view of a part of a second preferred embodiment of a control system according to the invention.

Referring to FIG. 2 of the drawings, there is shown a part of a second preferred embodiment of a control system according to the invention. The control system 80 is characterized in that the means 36 for having the gas turbine engine 10 have an engine braking effect comprises a hydraulic fluid pump 82 in lieu of the compressor 38 of the control system 34 shown in FIG. 1. In FIG. 2, like component elements are designated by the same reference numerals as those used in FIG. 1. The hydraulic fluid pump 82 is driven by the drive means 40 to produce pressurized hydraulic fluid so that an engine braking effect is given to the engine 10 to provide a braking force to decelerate the vehicle 12. The means 36 also comprises a hydraulic fluid tank 84 communicating with an inlet port (not shown) of the pump 82 and from which hydraulic fluid is drawn by the pump 82, and a pressurized hydraulic fluid reservoir 86 communicating with an outlet port (not shown) of the pump 82 and into which pressurized hydraulic fluid is discharged from the pump 82 to store the pressurized hydraulic fluid in the reservoir 86. A relief valve 88 is disposed in a conduit 90 to open it to release hydraulic fluid into the tank 84 when the pressure of hydraulic fluid in the reservoir 86 is above a predetermined value. In lieu of the nozzle 76 of the control system 34 of FIG. 1, a hydraulic fluid motor 92 is provided which communicates with the reservoir 86 to receive the pressurized hydraulic fluid therefrom for operation of the motor 92 and with the tank 84 to drain hydraulic fluid used in the motor 92 thereinto. A gear arrangement 94 is provided which is operatively connected to the motor 92 and to a drive shaft of the compressor 14 and the turbine 22. The gearing 94 is rotated by the operation of the motor 92 to maintain the rotation of the compressor 14 and the turbine 22 to make it possible to quickly accelerate the engine 10 when the vehicle 12 is coasting and to permit the engine 10 to idle to make it possible to quickly start the vehicle 12 when the vehicle 12 is temporarily at a standstill, similarly as described above.

Figure 3:
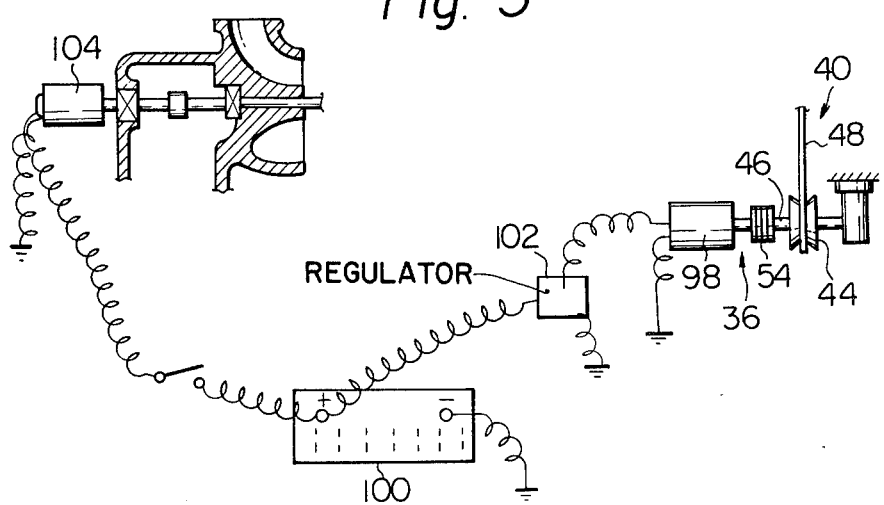
FIG. 3 is a schematic view of a part of a third preferred embodiment of a control system according to the invention.

Referring to FIG. 3 of the drawings, there is shown a part of a third preferred embodiment of a control system according to the invention. The control system 96 is characterized in that the means 36 comprises a generator 98 in lieu of the compressor 38 of the control system 34 of FIG. 1. In FIG. 3, like component elements are designated by the same reference numerals as those used in FIG. 1. The generator 98 is driven by the drive means 40 to produce an electric power so that an engine braking effect is given to the engine 10 to provide a braking force to decelerate the vehicle 12. A storage battery 100 is provided which is electrically connected to the generator 98 through a regulator 102 and is charged with an electric energy produced by the generator 98. In lieu of the nozzle 76 of the control system 34 of FIG. 1, a starting motor is provided which is electrically connected to the battery 100 and is fed with the stored electric power therefrom. The starting motor 104 is operatively connected to a drive shaft of the compressor 14 and the turbine 22 and is rotated by the electric power from the battery to cause the compressor 14 and the turbine to idle when the vehicle 12 is coasting and is temporarily at a standstill.

It was confirmed by an experiment that, when a motor vehicle equipped with a twin shaft gas turbine engine is coasting or decelerating with the engine employed as a brake, fuel consumption is reduced 15%. In order to utilize such an effect, the supply of fuel to the combustion chamber 18 is cut off and the energy producing device 38 is disconnected from drive means of the vehicle 12 such as the propeller shaft 28 to be inoperative, for example, by demagnetizing the electromagnetic clutch 54 when the vehicle 12 is coasting at a speed above a predetermined value, for example, such as 40 Km/hr, and the fuel supply is cut off and the energy producing device 38 is connected to the vehicle 12 to be driven thereby, for example, by magnetizing the electromagnetic clutch 54 when the vehicle 12 is coasting at a speed below the predetermined value.

It will be appreciated that the invention provides a control system for a gas turbine engine for a motor vehicle which comprises an energy producing device driven by movement of the vehicle during coasting operation thereof and during idling of the engine to produce an engergy stored and (1) concurrently to give an engine braking effect to the engine to function as a brake to decelerate the vehicle, means for (2) ceasing the supply of fuel to a combustion chamber for the engine during coasting of the vehicle and when the vehicle is temporarily at a standstill or the engine is idling, and means for (3) feeding the stored energy to the engine in lieu of fuel during coasting of the vehicle and during idling of the engine to utilize the energy for rotation of a compressor and a power turbine of the engine so that the feature (1) provides the result of increasing the effectiveness of the engine braking for the vehicle and reducing the load of a third brake of the vehicle and the features (2) and (3) provide the result of reducing the fuel consumption of the engine and reducing the load of a starting motor of the engine or reducing the discharge of an electric power from a storage battery of the engine.

What is claimed is:

1. A control system in combination with a gas turbine engine for a motor vehicle, said gas turbine engine including a compressor, a combustion chamber, fuel supply means for supplying fuel into said combustion chamber, a turbine and an output shaft, said control system comprising an accelerator pedal for controlling fuel supplied from said fuel supply means into said combustion chamber, an energy producing device driven by said output shaft to produce energy and concurrently to provide said gas turbine engine with an engine braking effect, first drive means for connecting said output shaft to said energy producing device for driving said gas turbine including drive control means for connecting said energy producing device to said first drive means when said accelerator pedal is released and for disconnecting said energy producing device from said first drive means when said accelerator pedal is depressed, said control system having means for utilizing for rotation of said engine in lieu of fuel said energy produced by said energy producing device said energy utilizing means including storage means communicating with said energy producing device and fed with energy therefrom to store said energy in said storage means and second drive means communicating with said storage means and fed with said energy therefrom for driving said compressor; and said energy producing device comprises an air compressor connected to said first drive means for driving said air compressor and producing compressed air when driven and said storage means comprises a compressed air reservoir communicating with an outlet port of said air compressor and fed with said compressed air therefrom to store said compressed air and said second drive means comprises a nozzle for injecting said compressed air toward said turbine to rotate said turbine, said nozzle communicating with said reservoir for supply of said compressed air to said nozzle.

2. A control system as claimed in claim 1, further comprising means for interrupting the supply of fuel from said fuel supply means to said combustion chamber when said accelerator pedal is released.

3. A control system as claimed in claim 1, further comprising means for interrupting the supply of fuel from said fuel supply means to said combustion chamber when the speed of said vehicle is below a predetermined value with said accelerator pedal released.

4. A control system as claimed in claim 1, further comprising an air cleaner communicating with the atmosphere and with an inlet port of said air compressor.

5. A control system as claimed in claim 1, in which said drive control means comprises an electromagnetic clutch interposed between said energy producing device and said first drive means to control connection therebetween, and sensing means electrically connected to said electromagnetic clutch and responsive to said accelerator pedal being released to magnetize said electromagnetic clutch to provide said connection and to said accelerator pedal being depressed to demagnetize said electromagnetic clutch to cease said connection.

6. A control system as claimed in claim 2, in which said fuel supply interrupting means comprises a control valve for controlling the flow of fuel fed to said combustion chamber, and a controller for controlling the degree of opening of said control valve in accordance with the degree of depression of said accelerator pedal and closing said control valve when said accelerator pedal is released.

7. A control system as claimed in claim 3, in which said fuel supply interrupting means comprises a first control valve for controlling the flow of fuel fed to said combustion chamber, a controller for controlling the degree of opening of said control valve in accordance with the degree of depression of said accelerator pedal, and a second control valve disposed in said fuel flow downstream of said first control valve and closed to cut off said fuel flow when the speed of said vehicle is below a predetermined value with said accelerator pedal released.

8. A control system in combination with a gas turbine engine for a motor vehicle, said gas turbine engine including a combustion chamber having an inlet and an outlet, a compressor communicating with said inlet of said combustion chamber, fuel supply means for supplying fuel into the combustion chamber, a turbine communicating with said outlet of said combustion chamber, and an output shaft, said control system comprising
   an air compressor producing compressed air when driven,
   drive means for connecting said air compressor to said output shaft for driving said air compressor,
   a compressed air reservoir communicating with an output port of said compressor for storing compressed air fed therefrom, and
   means defining a passage for providing communication between said compressed air reservoir and said outlet of said combustion chamber for feeding said compressed air to said turbine.

9. A control system in combination with a gas turbine engine for a motor vehicle, said gas turbine engine including a compressor, a combustion chamber, fuel supply means for supplying fuel into the combustion chamber, a turbine and an output shaft, said control system comprising
- an air compressor producing compressed air when driven,
- drive means for connecting said air compressor to said output shaft for driving said air compressor,
- a compressed air reservoir communicating with an output port of said air compressor for storing compressed air fed therefrom,
- means defining a passage for providing communication between said compressed air reservoir and said engine for feeding said compressed air thereinto for driving said engine,
- an accelerator pedal for controlling fuel supplied from said fuel supply means into said combustion chamber, and
- drive control means for connecting said air compressor to said drive means when said accelerator pedal is released and for disconnecting said air compressor from said drive means when said accelerator pedal is depressed.

10. A control system in combination with a gas turbine engine of a motor vehicle, said gas turbine engine including a combustion chamber having an inlet and an outlet, a compressor communicating with said inlet of said combustion chamber, fuel supply means for supplying fuel into said combustion chamber, a turbine communicating with said outlet of said combustion chamber, and an output shaft, said control system comprising
- an accelerator pedal for controlling fuel supplied from said fuel supply means into said combustion chamber,
- an air compressor producing compressed air when driven and having an input shaft and an outlet port,
- drive means for connecting said output shaft to said input shaft of said air compressed for driving same,
- a compressed air reservoir communicating with said outlet port of said air compressor for storing compressed air fed therefrom, and
- means defining a passage for providing communication between said compressed air reservoir and said outlet of said combustion chamber for injecting compressed air to said turbine.

11. A control system as claimed in claim 10, in which said drive means comprises a driving pully fixedly connected to said output shaft, a driven pulley fixedly mounted on said input shaft of said air compressor, and a belt engaging both said driving and driven pulleys.

12. A control system as claimed in claim 10, further comprising
- sensing means for sensing a released condition of the accelerator pedal and a depressed condition thereof, and
- an electromagnetic clutch interposed in said input shaft, said electromagnetic clutch being electrically connected to said sensing means for connecting said air compressor to said drive means in response to said released condition of the accelerator pedal sensed by said sensing means and for disconnecting said air compressor from said drive means in response to said depressed condition of the accelerator pedal sensed by said sensing means.

13. A control system as claimed in claim 10, in which said air compressor is of a displacement type.

14. A control system as claimed in claim 10, further comprising
- sensing means for sensing a released condition of the accelerator pedal, and
- fuel supply interrupting means for interrupting the supply of fuel from said fuel supply means into the combustion chamber of the engine in response to said released condition of the accelerator pedal sensed by said sensing means.

15. A control system as claimed in claim 10, further comprising
- first sensing means for sensing a released condition of the accelerator pedal,
- second sensing means for sensing the speed of the vehicle, and
- fuel supply interrputing means for interrupting the supply of fuel from said fuel supply means into the combustion chamber of the engine in response to said released condition of the accelerator pedal sensed by said first sensing means and to vehicle speeds below a predetermined value which are sensed by said second sensing means.

* * * * *